(12) United States Patent
Loncle

(10) Patent No.: US 10,696,415 B2
(45) Date of Patent: Jun. 30, 2020

(54) PROPULSION UNIT FOR AN AIRCRAFT, WITH REDUCED AERODYNAMIC DRAG

(71) Applicant: SAFRAN NACELLES, Gonfreville l'Orcher (FR)

(72) Inventor: Alexis Loncle, Gonfreville l'Orcher (FR)

(73) Assignee: Safran Nacelles, Gonfreville l'Orcher (FR)

( * ) Notice: Subject to any disclaimer, the term of this patent is extended or adjusted under 35 U.S.C. 154(b) by 0 days.

(21) Appl. No.: 16/222,266

(22) Filed: Dec. 17, 2018

(65) Prior Publication Data

US 2019/0202574 A1 Jul. 4, 2019

Related U.S. Application Data

(63) Continuation of application No. PCT/FR2017/051508, filed on Jun. 13, 2017.

(30) Foreign Application Priority Data

Jun. 17, 2016 (FR) ...................................... 16 55684

(51) Int. Cl.
*B64D 29/06* (2006.01)
*B64D 27/18* (2006.01)

(52) U.S. Cl.
CPC ............. *B64D 29/06* (2013.01); *B64D 27/18* (2013.01)

(58) Field of Classification Search
CPC ................................ B64D 29/06; B64D 27/18
See application file for complete search history.

(56) References Cited

FOREIGN PATENT DOCUMENTS

EP       1092859       4/2001
EP       2690273   *   1/2014

OTHER PUBLICATIONS

International Search Report for international patent application PCT/FR2017/051508, dated Aug. 28, 2017.

* cited by examiner

*Primary Examiner* — Justin M Benedik
(74) *Attorney, Agent, or Firm* — Burris Law, PLLC

(57) ABSTRACT

A nacelle for an aircraft turbojet engine includes a fixed internal structure intended to receive an aircraft turbojet engine and an external structure. The fixed internal structure and external structure defines a flow channel for a secondary air flow. A set of lower and upper beams are linked together by the fixed internal structure. An external wall of the lower beam is designed to partially define an external aerodynamic surface of the nacelle, intended to come into contact with an outer air flow. The external wall of the lower beam is further designed to tolerate the damage caused by the outer air flow.

4 Claims, 3 Drawing Sheets

PROPULSION UNIT FOR AN AIRCRAFT, WITH REDUCED AERODYNAMIC DRAG

CROSS-REFERENCE TO RELATED APPLICATIONS

This application is a continuation of International Application No. PCT/FR2017/051508, filed on Jun. 13, 2017, which claims priority to and the benefit of FR 16/55684 filed on Jun. 17, 2016. The disclosures of the above applications are incorporated herein by reference.

FIELD

The present disclosure relates to the field of turbojet engine nacelles for an aircraft with a high bypass ratio.

BACKGROUND

The statements in this section merely provide background information related to the present disclosure and may not constitute prior art.

An aircraft is moved by several turbojet engines each housed within a nacelle. The propulsion unit constituted by a turbojet engine and the nacelle that receives it is shown in FIG. 1 referred thereto.

The propulsion unit 1 comprises a nacelle 3 supporting a turbojet engine 5. The propulsion unit 1 is connected to the aircraft fuselage (not shown) for example by means of a pylon 7 intended to be suspended under a wing of the aircraft.

The nacelle 5 generally has a tubular structure comprising an upstream section 9 defining an air inlet upstream of the turbojet engine 5, a median section 11 intended to surround a fan of the turbojet engine, a downstream section 13 comprising an outer cowling 15 able to accommodate a thrust reverser device and intended to surround the combustion chamber of the turbojet engine, and is generally terminated by an ejection nozzle whose outlet is located downstream of the turbojet engine.

This nacelle accommodates the turbojet engine 5 which can be of the bypass type, adapted to generate, via the blades of the rotating fan, a hot air flow (also called primary flow), coming from the combustion chamber of the turbojet engine, and a cold air flow (secondary flow) that circulates outside the turbojet engine through a flow path 17 (half-flow path 17a shown in FIG. 2), also called annular channel, formed between a fairing of the turbojet engine and an inner wall 18 (inner half-wall 18a shown in FIG. 2) of the outer structure 21 (outer half-structure 21a shown in FIG. 2) of the nacelle. The two air flows are ejected from the turbojet engine from the rear of the nacelle.

Reference is made to FIG. 2 showing a right half-shell 13a of a nacelle that constitutes, with a second half-shell (not represented, obtained by symmetry relative to a median plane of the nacelle), the downstream structure 13 of the nacelle able to surround the combustion chamber of the turbojet engine (not represented in this figure). It should be noted that this downstream structure can integrate a thrust reversal device, on the understanding that the invention also applies to a smooth nacelle case, that is to say devoid of a thrust reversal device.

The references FRONT and REAR respectively designate the front (upstream) and rear (downstream) portions of the half-shell 13a, relative to the direction of the air flow intended to circulate inside this half-shell 13a.

In this case, this half-shell 13a includes an inner half-structure 19a, defining a half-cavity C intended to receive the turbojet engine (not represented). An inner structure 19 is obtained by the assembly of two inner half-structures 19a and 19b (only the half-structure 19a is shown in FIG. 2, the half-structure 19b being positioned symmetrically with the half-structure 19a relative to the median plane of the nacelle).

This half-shell 13a also includes an outer structure 21a defining, with the inner half-structure 19a, a half-flow path 17a intended to be traversed by a cold air flow circulating between the front and the back of the half-shell 13a and defining, with the half-flow path obtained by symmetry relative to the median plane of the nacelle, the flow path 17 or annular channel.

The connection of the engine to the aircraft is carried out by means of a support structure comprising two upper longitudinal half-beams 23a, 23b (only the half-beam 23a is shown in FIG. 2, the half-beam 23b being positioned symmetrically with the half-beam 23a relative to the median plane of the nacelle), conventionally called 12 o'clock beams because of their position at the top of the nacelle and two lower longitudinal half-beams 25a, 25b (only the half-beam 25a is shown in FIG. 2, the half-beam 25b being positioned symmetrically with the half-beam 25a relative to the median plane of the nacelle), conventionally called 6 o'clock beams because of their position in the lower portion of the nacelle. The lower "6 o'clock" half-beams 25a, 25b are conventionally faired by means of fairing sheets 26 (represented in FIG. 3 showing the nacelle 3 viewed from the bottom) intended to come into contact with the outer air flow flowing around the nacelle.

The 12 o'clock and 6 o'clock half-beams are interconnected, on the one hand, via the inner structure 19 surrounding the turbojet engine and, on the other hand, via a substantially annular structure called front frame and generally formed of two front half-frames 27a, 27b (only the front half-frame 27a is shown in FIG. 2, the front half-frame 27b being positioned symmetrically with the front half-frame 27a relative to the median plane of the nacelle) each extending between said corresponding half-beams on both side of the median plane of the nacelle. This front frame is intended to be fixed to the periphery of a downstream edge of a casing of the fan engine and thus contribute to the recovery and transmission of forces between the different portions of the nacelle and of the turbojet engine. Furthermore, in the case of a nacelle equipped with a cascade thrust reverser device, the front frame is also used to support the cascades of the thrust reverser.

Conventionally, a cascade thrust reverser comprises two half-cowls (forming the outer cowling 15 shown in FIG. 1) each slidably mounted on the upper 23a, 23b and lower 25a, 25b half-beams. For this purpose, the upper and lower half-beams are generally equipped with primary and secondary guide rails allowing a sliding movement of the half-cowls of the cascade thrust reverser, on its associated half-beam between alternately a position of the thrust reverser in direct jet according to which the half-cowls ensure the aerodynamic continuity of the nacelle and a position of the thrust reverser in reverse jet according to which the half-cowls are displaced downstream of the nacelle.

The bypass ratio of a turbojet engine is defined by the ratio between the air mass of the cold air flow passing through the flow path of the propulsion unit and the mass of the hot air flow passing through the turbojet engine. In engines with a high bypass ratio (for example a ratio of 10), the diameter of the flow path 17 of the cold air flow is increased relative to an engine with a lower bypass ratio.

The increase in the diameter of the flow path 17 results in a radial distance, relative to the longitudinal axis of the propulsion unit, of the lower "6 o'clock" half-beams 25a, 25b.

Referring to FIGS. 3 to 5 on which is schematized, for a better understanding, this radial distance of the lower "6 o'clock" half-beams 25a, 25b induced by the increase in the diameter of the flow path 17.

The radial distance of the lower half-beams 25a, 25b results in a radial distance of the fairing sheets 26 (shown in FIG. 3 illustrating the nacelle viewed from the bottom) fixed on the outer wall of the lower "6 o'clock" half-beams and coming into contact with an outer air flow $F_{ext}$ flowing around the nacelle.

Referring to FIG. 4 illustrating the downstream section 13 of the nacelle in longitudinal section on which there is shown an aerodynamic surface 29 defined by the fairing sheets 26 and an aerodynamic surface 31 that would be obtained when the diameter of the flow path 17 would have been increased in order to obtain an engine with a higher bypass ratio.

It is noticed in this figure that the outer aerodynamic surface 31 of the nacelle has become radially more distant relative to the longitudinal axis 33 of the nacelle and relative to the outer aerodynamic surface 29 obtained for an engine with a lower bypass ratio.

This increase in the diameter of the nacelle results in an increase in the size and the mass of the nacelle. In addition, this also directly results in an increase in the size of the "beavertail" or "six o'clock rear beam fairing," a term used to designate the fairing 35 in the form of a "beaver tail" downstream of the nacelle and shown in FIGS. 3 and 5. The increase in the size and the mass of the nacelle and in the "beavertail" causes an increase in the aerodynamic drag of the nacelle.

SUMMARY

The present disclosure provides a nacelle for an aircraft turbojet engine with a high bypass ratio, having a reduced aerodynamic drag.

To this end, the present disclosure relates to a nacelle for an aircraft turbojet engine, the nacelle comprising:

an inner fixed structure intended to receive an aircraft turbojet engine;

an outer structure, defining with said inner fixed structure, a flow path of a secondary air flow; and a set of lower and upper beams, interconnected by the inner fixed structure, said nacelle being remarkable in that an outer wall of the lower beam is designed to define at least partially an outer aerodynamic surface of the nacelle, intended to come into contact with an air flow external to said nacelle, said outer wall of the lower beam being further designed to be tolerant to the damage caused by said outer air flow.

Thus, by providing for a nacelle whose outer wall of the lower beam is designed to define at least partially an outer aerodynamic surface of the nacelle and to be tolerant to the damage caused by the air flow to external said nacelle, the aerodynamic fairing sheets present in the prior art are removed. This allows reducing the radial thickness of the lower beam relative to the thickness obtained for a lower beam used in a turbojet engine with equivalent bypass ratio.

This allows reducing, relative to the prior art for a turbojet engine having a bypass ratio equal to that of the present disclosure, both the dimensions of the nacelle, determined by its diameter, and those of the "beavertail," a term used to define the outer fairing downstream of the nacelle whose dimensions are directly a function of the radial distance of the beam relative to the longitudinal axis of the propulsion unit.

By managing to reduce, relative to the prior art, the dimensions of the nacelle and of the "beavertail" used for a turbojet engine with a bypass ratio equal to that of the prior art, the mass of the nacelle and of the beavertail is reduced, which advantageously allows reducing the aerodynamic drag of the nacelle.

Furthermore, the removal of the aerodynamic fairing sheets provided in the prior art allows the "6 o'clock" lower beam to be directly in contact with the outer air flow. Thus, the outer air flow laps the 6 o'clock lower beam, which allows cooling more effectively the lower beam relative to the prior art. This is very advantageous because the propulsion unit area in which the 6 o'clock lower beam is located is a hot area of the propulsion unit. Additional cooling means of the beam may not be needed thanks to the present disclosure.

According to optional characteristics of the present disclosure, the outer structure of the nacelle of the present disclosure accommodates thrust reversal device comprising at least one movable thrust reverser cowl, and the lower and upper beams receive guide rails in translation of said movable thrust reverser cowl.

Moreover, the lower beam of the nacelle of the present disclosure comprises two half-beams symmetrically distributed relative to a median plane of the nacelle.

The present disclosure also concerns a propulsion unit for an aircraft, remarkable in that it comprises a nacelle according to the present disclosure and a turbojet engine supported by said nacelle, said turbojet engine having a bypass ratio comprised between 8 and 15.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
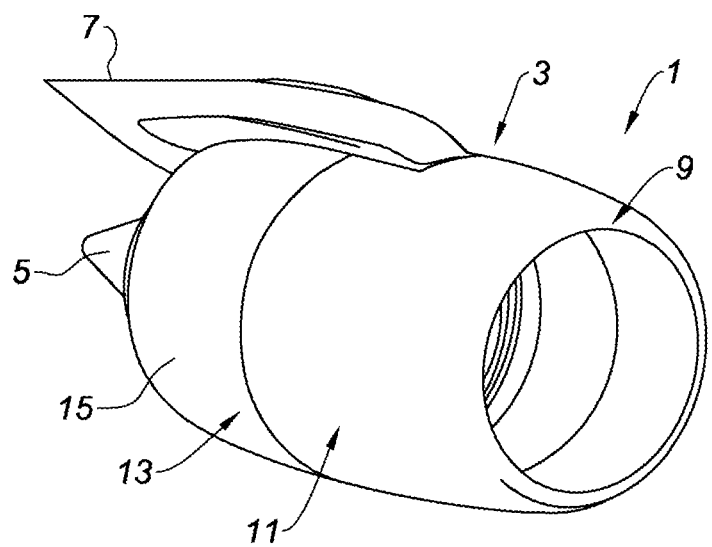
FIG. 1 illustrates an isometric view of a propulsion unit according to the prior art.
Figure 2:
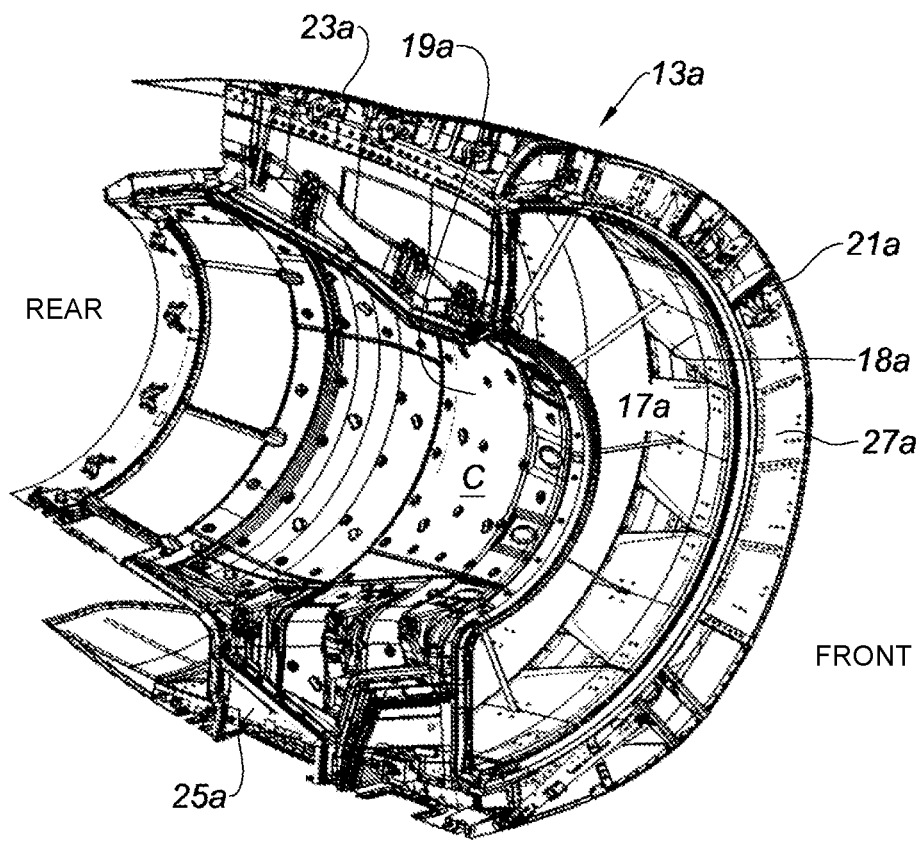
FIG. 2 represents a half-shell of the downstream section of a nacelle according to the prior art.
Figure 3:
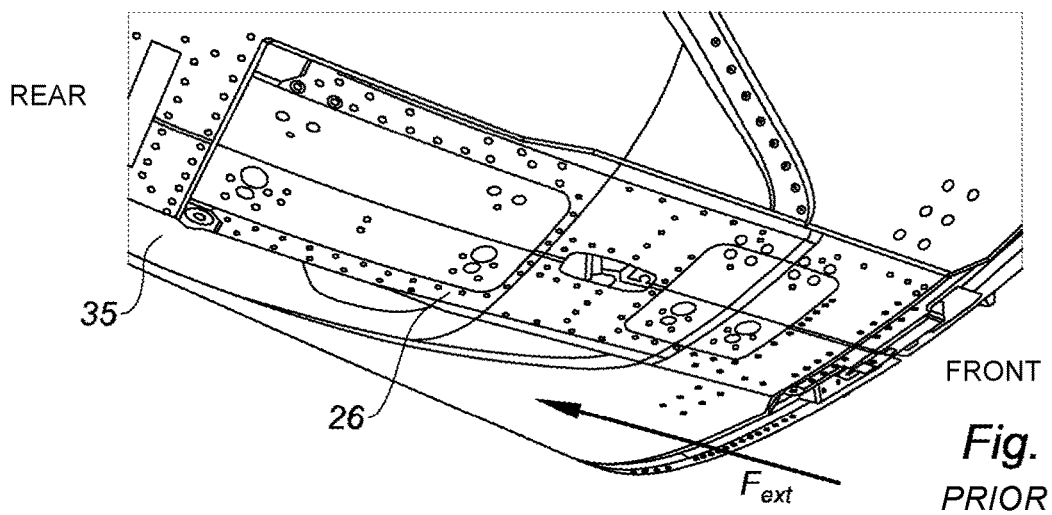
FIG. 3 is a bottom view of the nacelle, centered on its downstream section according to the prior art.
Figure 4:
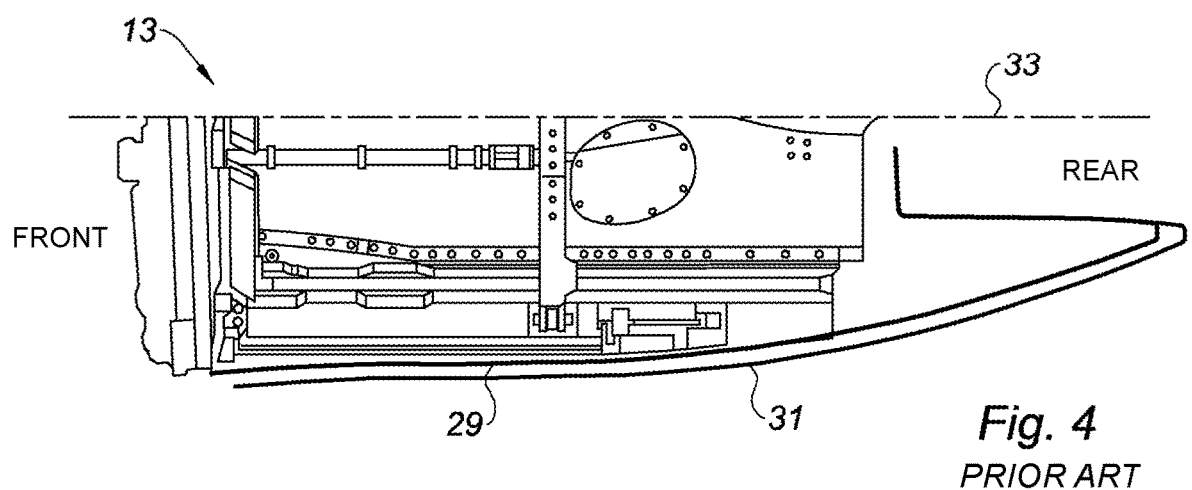
FIG. 4 represents the downstream section of the nacelle in a longitudinal section on which the aerodynamic surfaces of the nacelle are represented according to the prior art.
Figure 5:
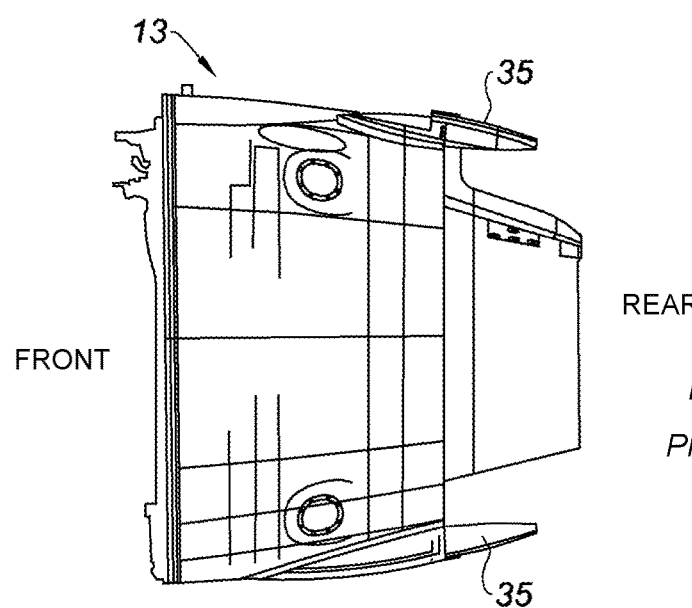
FIG. 5 is a side view of the downstream section of the nacelle according to the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the description and the claims, the terms "inner" and "outer" are used in a non-limiting manner with reference to the radial distance relative to the longitudinal axis of the nacelle, the expression "inner" defining a zone radially closer to the longitudinal axis of the nacelle, as opposed to the term "outer".

Figure 6:
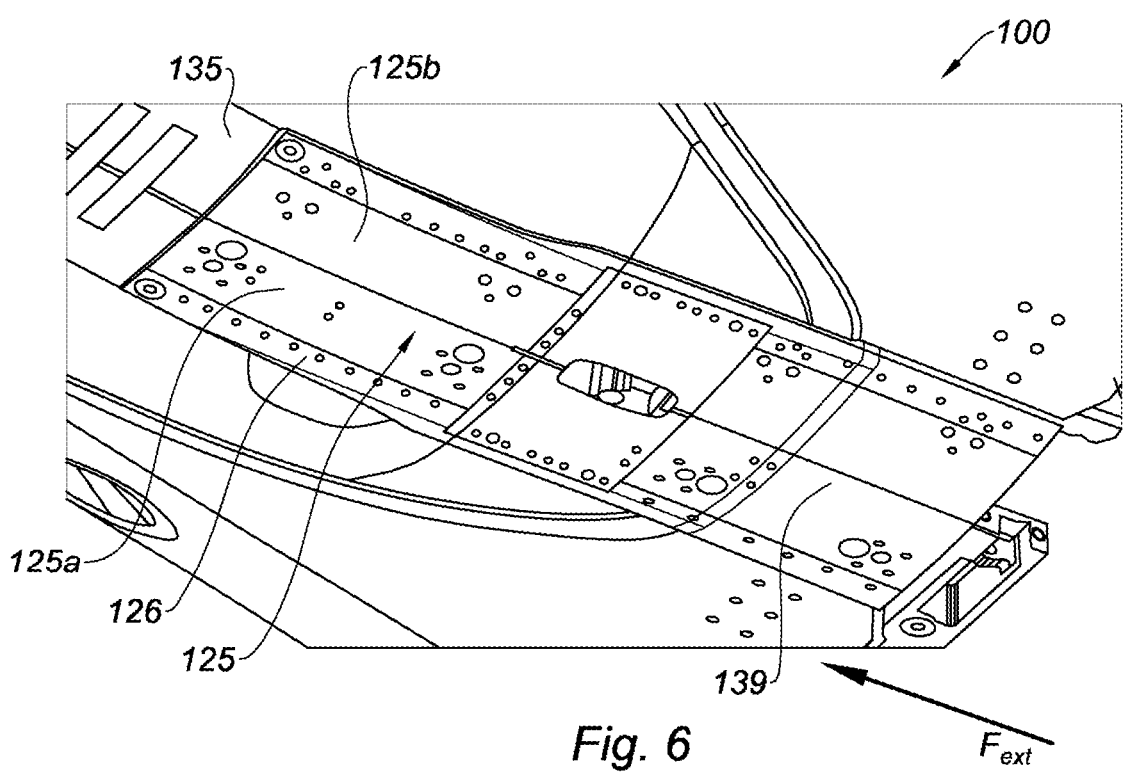
FIG. 6 is a bottom view of a nacelle according to the present disclosure, centered on its downstream section.

Referring to FIG. 6, a nacelle 100 according to the present disclosure is represented, in a bottom view.

The nacelle according to the present disclosure differs from that presented with reference to FIGS. 1 to 5 in that the "six o'clock" lower beam 125 has an outer wall 126 designed to define at least partially an outer aerodynamic surface of the nacelle. The expression "designed to define at least partially an outer aerodynamic surface of the nacelle" means the characteristic according to which the beam 125 joins the outer aerodynamic surface 139 of the nacelle. In other words, it is directly the outer wall 126 of the lower beam 125 that is intended to come into contact with an outer air flow $F_{ext}$ to said nacelle. The lower beam 125 is thus designed to be tolerant to the damage caused by the outer air flow $F_{ext}$ flowing around the nacelle 100.

As previously indicated, the fact of providing for a nacelle whose outer wall 126 of the lower beam 125 is designed to define at least partially the outer aerodynamic surface 139 of the nacelle and is intended to come into contact with an air flow $F_{ext}$ external to said nacelle, the aerodynamic fairing sheets present in the related art are removed. This allows reducing the radial thickness of the lower beam 125 relative to the thickness obtained for a lower beam of the related art, used in a turbojet engine with an equivalent bypass ratio.

This allows reducing, relative to the related art for a turbojet engine having a bypass ratio equal to that of the present disclosure, both the dimensions of the nacelle, determined by its diameter, and those of the "beavertail" 135.

The mass of the nacelle 125 and of the "beavertail" 135 is thus reduced relative to the related art for a turbojet engine having an equivalent bypass ratio. The aerodynamic drag of the nacelle 125 is then reduced.

In addition, the removal of the aerodynamic fairing sheets provided in the related art allows the lower beam 125 to be directly in contact with the outer air flow $F_{ext}$. Thus, the outer air flow $F_{ext}$ laps the lower beam 125, which allows cooling more effectively the lower beam 125 relative to the related art. This is very advantageous because the area of the propulsion unit in which the lower beam 125 is located is a hot propulsion unit area. Additional cooling means of the beam may not be needed thanks to the present disclosure.

Moreover, the lower beam 125 comprises, like the lower beam 25 of the related art, two lower half-beams 125a, 125b symmetrically distributed relative to the median plane of the nacelle. Each lower half-beam 125a, 125b can receive guide rails in translation of the movable thrust reverser cowl when the downstream section of the nacelle accommodates a thrust reverser device. The upper half-beams 23a, 23b defining the upper beam 23 then also receive guide rails in translation of the movable thrust reverser cowl.

The present disclosure is intended to be implemented, for example, on small-sized nacelles, that is to say nacelles having an air input diameter in the order of 180 centimeters. Of course, this size is only given as an indication and the present disclosure can quite be implemented on nacelles of different sizes, having a diameter in particular comprised between 100 cm and 300 cm.

Moreover, the present disclosure also concerns a propulsion unit comprising a nacelle according to the present disclosure supporting a turbojet engine having a bypass ratio, for example, between 8 and 15.

It goes without saying that the nacelle and propulsion unit described above is for illustrative purposes only and the present disclosure is not limited to the nacelle and the propulsion unit described above, but instead all the variants involving the technical equivalents of the means described and their combinations fall within the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A nacelle for an aircraft turbojet engine comprising:
    an inner fixed structure for receiving the aircraft turbojet engine;
    an outer structure, the outer structure and the inner fixed structure defining a secondary air flow path; and
    a lower beam and an upper beam interconnected by the inner fixed structure,
    wherein the lower beam extends along a length of the nacelle from an upstream portion towards a downstream portion of the nacelle, and an outer wall of the lower beam defines an outer aerodynamic surface of the nacelle that comes into contact with an outer air flow from the upstream portion toward the downstream portion of the nacelle.

2. The nacelle according to claim 1, wherein the outer structure of the nacelle accommodates a thrust reversal device comprising at least one movable thrust reverser cowl, and the lower and upper beams receive guide rails in translation of said at least one movable thrust reverser cowl.

3. The nacelle according to claim 1, wherein the lower beam comprises two half-beams symmetrically distributed relative to a median plane of the nacelle.

4. A propulsion unit for an aircraft comprising a nacelle according to claim 1 and a turbojet engine supported by said nacelle, said turbojet engine having a bypass ratio between 8 and 15.

* * * * *